Dec. 27, 1966   J. M. WILLIAMS ETAL   3,294,456
SHAFT BEARING HAVING SELF-CONTAINED LUBRICANT RESERVOIR
Filed June 7, 1963
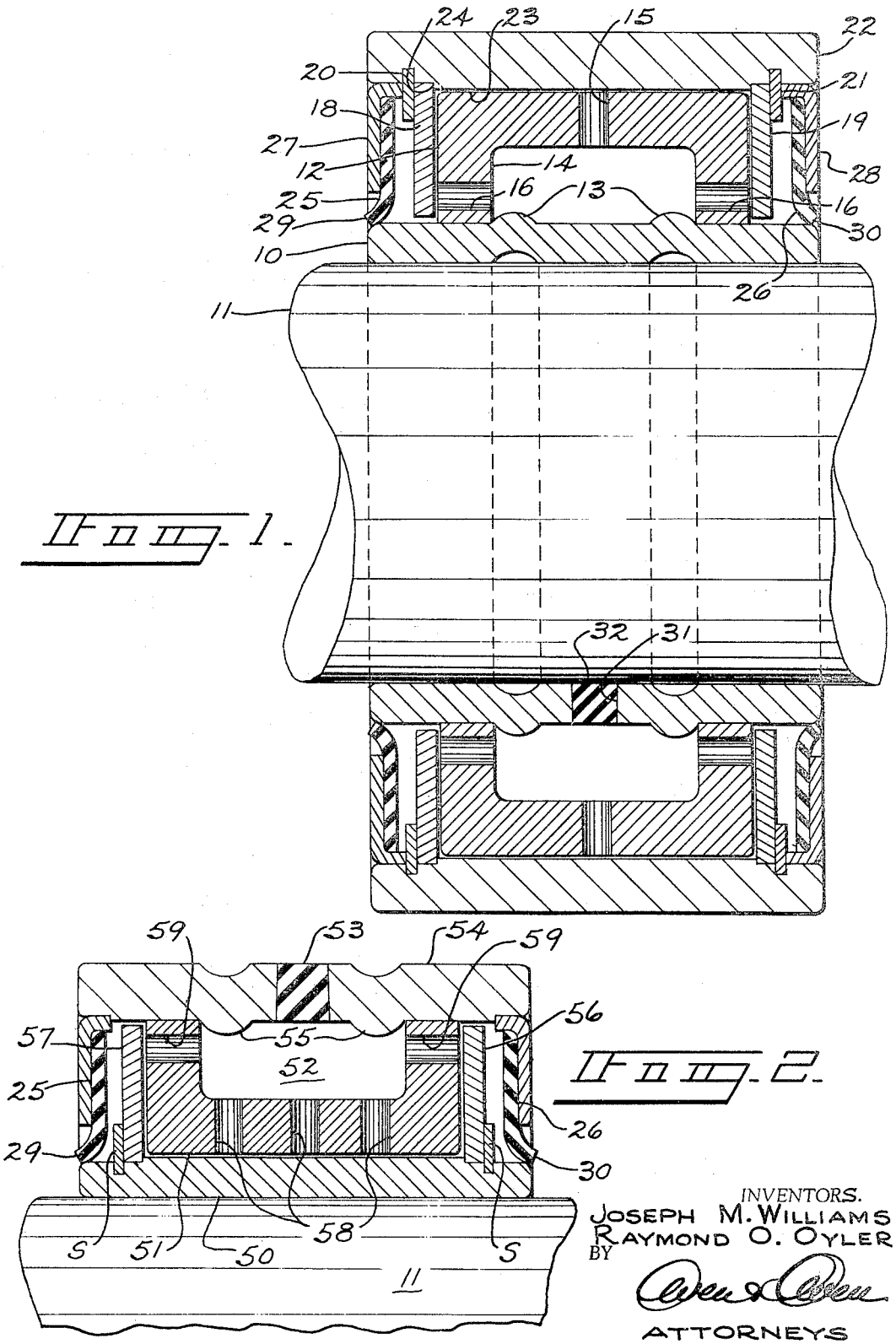
INVENTORS.
JOSEPH M. WILLIAMS
RAYMOND O. OYLER
BY
Owen & Owen
ATTORNEYS

United States Patent Office 3,294,456
Patented Dec. 27, 1966

3,294,456
SHAFT BEARING HAVING SELF-CONTAINED
LUBRICANT RESERVOIR
Joseph M. Williams and Raymond O. Oyler, Maumee, Ohio, assignors to The Bunting Brass and Bronze Company, Toledo, Ohio, a corporation of Ohio
Filed June 7, 1963, Ser. No. 286,411
1 Claim. (Cl. 308—36.1)

This invention relates to shaft bearings and is particularly directed to a sealed bearing having a stationary outer member and a rotatable inner member with a captive separate internal lubricant supply for the bearing interfacial surfaces.

A primary object of the invention is to provide a sealed bearing having improved lubricant flow to the bearing surface from a self-contained reservoir.

Another object of the invention is to provide a sealed bearing having guide rings that serve the dual function of channeling lubricant to or from the bearing surface and assist in the transfer of axial or thrust forces imposed on the bearing.

Another object of the invention is to provide a sealed bearing having the capability of absorbing thrust forces imposed thereon.

Other objects and advantages of the invention will become apparent from the following description of two preferred modifications, reference being had to the accompanying drawings, in which:

FIG. 1 is a central sectional view of a sealed bearing embodying the present invention, with a journalled shaft shown in full lines, and FIG. 2 is a fragmentary central sectional view of a modified form of bearing embodying the invention.

Referring to the drawings, the bearing of the present invention includes an inner sleeve 10 having a cylindrical interior for the reception of a supported shaft 11. In the drawings the shaft has a driven fit in the inner sleeve 10. An inner bearing member 12 is held fast on the sleeve 10 to rotate therewith and with the shaft 11.

The inner bearing member 12 may be made from any suitable bearing material, such as resin or a metal such as brass or bronze, sintered or cast, and may be porous or non-porous. In the form shown in FIG. 1 the load bearing surface of the bearing member 12 is external and cylindrical. The surface may, under certain conditions be crowned to any desired degree. A crowned surface if formed on a continuous and uniform radius will result in a semi-toroidal configuration having advantages for low speed operation.

The inner bearing member 12 is made hollow to form a lubricant reservoir 14 in its interior which is annular and continuous. One or more lubricant dispensing passages 15 extend from the reservoir 14 to the bearing interface between the inner and outer bearing members and return passages 16 in the inner bearing member extend between the reservoir and the end or cheek surfaces of the bearing member 12. If the inner bearing member 12 is made of a porous, sintered material the lubricant supply and return passages will be formed by the interstices between the sintered particles, and the drilling of discrete and separate passages such as 15 and 16 may be dispensed with.

The hollow inner bearing member is fixed against axial displacement relative to the sleeve 10 preferably by spinning spaced beads 13 inwardly from the sleeve into the lubricant reservoir 14, the sides of the beads engaging the side walls of the reservoir. By this construction, an axial force imposed on the shaft, or thrust forces, will be taken between the cheeks or sides of the inner bearing member and radially extending annular thrust rings or lubricant guide rings 18 and 19.

The guide rings 18 and 19 are held in the outer bearing member in any suitable manner as by snap rings 20 and 21.

An outer bearing member is designated 22 in FIG. 1 and includes a cylindrical body having a bearing surface 23 substantially coextensive with the bearing surface of the inner member 12 with which it is mated. The outer bearing member is provided with spaced shoulders 24 against which the lubricant guide rings or thrust rings 18 and 19 are held by their respective snap rings.

Resilient lubricant seal rings 25 and 26 are provided at each end of the bearing and are held in the stationary outer bearing member 22 by inwardly extending annular seal ring cups 27 and 28 which may be frictionally engaged with the inner surface of the outer bearing member and which stop short of the inner bearing member to leave flexible lips 29 and 30 of the seal rings exposed for engagement with the rotating inner bearing member or sleeve near the ends thereof. Obviously, any suitable configuration of the lubricant seal rings may be used and the disclosure in this respect is diagrammatic.

Lubricant is filled into the reservoir 14 in the hollow bearing member 12 through a filler opening 31 which is then closed by a resilient plug 32. Depending on the viscosity and character of the lubricant, the reservoir may be previously packed with a fibrous material such as cotton waste, or it may be left open and free so that the lubricant may fill substantially the entire reservoir volume.

In the operation of the sealed bearing so far described, the shaft 11 is fitted into the sleeve 10, and the outer, stationary bearing member 22 is fixed in a stationary element such as a motor end bell or the like. The radial force on the shaft 10 is taken between the outer face of the inner bearing 12 and the inner face of the stationary bearing member 22. Any thrust force that might occur in the installation is taken from the sleeve 10 through beads 13 to the inner bearing member to force one or the other of the cheeks or side faces of the inner bearing member against an adjacent one of the thrust rings 18 or 19. The thrust rings, of course, will transmit the axial force to the stationary bearing member 22 through their snap rings 20 or 21.

During operation, lubricant from the reservoir 14 is moved by centrifugal force through the radial passages 15 to the bearing surface and spreads laterally and circumferentially around the entire periphery of the bearing. Continued pressure from the centrifugal force causes the lubricant to be forced out at the ends of the inner bearing member and to return along the cheeks of the bearing to the areas adjacent the return passages 16. Since the pressure in the reservoir 14 is lower at points close to the sleeve 10 than on the surface adjacent the supply passages 15 the lubricant will be drawn back into the reservoir through the return passages. The returning lubricant will tend to adhere to the cheeks of the rotating bearing member or it may be thrown off onto the adjacent thrust ring to flow inwardly. The thrust rings thus serve the additional function of lubricant guide rings. Any small quantity of lubricant that may adhere to the sleeve 12 and tend to flow axially therealong is retained within the bearing by the seal rings 25 and 26.

In the form of the invention shown in FIG. 2 the disposition of the lubricant reservoir is changed, and the structure modified to accommodate such change. The inner bearing member in this instance comprises a sleeve 50 fixed to rotate with the supported shaft. The outer bearing member is designated 51 and includes a hollow cylindrical body having a peripheral reservoir 52 into which lubricant is charged through an opening 53 in an outer sleeve 54. Sleeve 54 is provided with spaced, peripheral thrust beads 55 which are rolled in after assembly into contact with the interior walls of the lubricant reservoir 52.

Lubricant guide rings 56 and 57 fixed to rotate with the inner bearing member 50 are spaced slightly away from the cheeks of the stationary outer bearing member 51 and are held in place by snap rings S. The rings act to transmit any axial thrust from the inner bearing member or the shaft to the cheeks of the outer bearing member 51 and, through the beads 55 to the frame of the machine in which the bearing is installed. The same seal construction as previously described may be used in this form, and these parts bear numerals similar to those used to designate the corresponding parts in the form shown in FIG. 1.

In this modification, the flow of lubricant is largely induced by a wiping action between the inner and outer bearing members, so that it is preferred to use a greater multiplicity of lubricant feed openings 58 to the bearing interface. Spaced return openings 59 open into the reservoir 52 near the outer walls thereof, and the lubricant is thrown and guided outwardly to the return openings by the rotating lubricant guide rings 56 and 57.

While the invention has been described in conjunction with cylindrical inner and outer bearing elements, it should be understood that the disclosure in this respect is diagrammatic. Various changes and modifications will suggest themselves to those skilled in the art, and it should be understood that such changes and modifications may be made without departing from the scope of the appended claim.

What we claim is:

A bearing comprising inner and outer mated bearing members, one of said bearing members being hollow, a sleeve member cooperating with said hollow bearing member to form a self-contained lubricant reservoir, said hollow bearing member having a plurality of lubricant dispensing passages communicating said reservoir with the interface between said inner and outer bearing members, and having a plurality of lubricant return passages, said sleeve member being retained against axial displacement relative to said hollow bearing member by a plurality of inwardly directed beads entering said lubricant reservoir and engaging the side walls thereof, radially extending lubricant guide members carried by one of said bearing members in close axial juxtaposition with said hollow bearing member, and axially spaced lubricant seals carried by said outer bearing member.

References Cited by the Examiner

UNITED STATES PATENTS

| | | | |
|---|---|---|---|
| 1,810,296 | 6/1931 | Sauer. | |
| 2,179,875 | 11/1939 | Baker et al. | 308—168 |
| 2,351,909 | 6/1944 | Beretish et al. | 308—109 |
| 2,665,176 | 1/1954 | Brantingham | 308—127 |
| 3,085,837 | 4/1963 | Wallgren | 308—121 |

FOREIGN PATENTS

| | | |
|---|---|---|
| 1,226,253 | 2/1960 | France. |
| 811,503 | 4/1959 | Great Britain. |
| 95,410 | 4/1939 | Sweden. |

DAVID J. WILLIAMOWSKY, *Primary Examiner.*

FRANK SUSKO, *Examiner.*

R. F. HESS, *Assistant Examiner.*